United States Patent
Wu et al.

(10) Patent No.: US 8,596,744 B2
(45) Date of Patent: Dec. 3, 2013

(54) KEY LABELING METHOD

(75) Inventors: Chang-Chin Wu, Tu-Cheng (TW); Li-Chi Pai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 13/111,921

(22) Filed: May 19, 2011

(65) Prior Publication Data
US 2012/0169806 A1    Jul. 5, 2012

(30) Foreign Application Priority Data

Dec. 30, 2010   (TW) .................................. 99146803

(51) Int. Cl.
*B41J 2/015* (2006.01)

(52) U.S. Cl.
USPC ........................................................ 347/20

(58) Field of Classification Search
None
See application file for complete search history.

(56) References Cited

U.S. PATENT DOCUMENTS

| | | | |
|---|---|---|---|
| 2007/0097197 A1* | 5/2007 | Kremers | 347/102 |
| 2007/0110893 A1* | 5/2007 | Lennon et al. | 427/96.1 |
| 2010/0238244 A1* | 9/2010 | Okamori | 347/102 |
| 2010/0253757 A1* | 10/2010 | Tseng et al. | 347/102 |

* cited by examiner

*Primary Examiner* — Stephen Meier
*Assistant Examiner* — Tracey McMillion
(74) *Attorney, Agent, or Firm* — Altis & Wispro Law Group, Inc.

(57) ABSTRACT

A method for printing a label on a keypad, including the steps of providing a substrate plate, spraying ink on the substrate plate to form a label layer, solidifying the label layer, spraying ink around the label layer to form a primer layer, and solidifying the primer layer.

19 Claims, 4 Drawing Sheets

KEY LABELING METHOD

BACKGROUND

1. Technical Field

The present disclosure relates to a key labeling method, and more particularly, to a method used for printing a label on a keypad.

2. Description of Related Art

A commonly used key labeling method for printing a label on a keypad includes the following two steps. Providing a keypad substrate plate and forming a plurality of primer layers on the keypad substrate plate with screen printing technology; etching the primer layers to form a label with laser etching technology on the keypad substrate plate to finish the process of printing a label on the keypad.

However, the commonly used key labeling method has a relatively high manufacturing cost and is time-consuming because of the laser etching step. A second commonly used key labeling method is provided to decrease the manufacturing cost. The second commonly used key labeling method includes one step, printing a label layer and a plurality of the primer layers on the keypad substrate plate simultaneously. The laser etching step is thereby omitted, efficiently decreasing the manufacturing cost. However, when using the second commonly used key labeling method, the labeled layer and the primer layers easily mix with each other thereby obtaining a deformed and distorted label on the keypad substrate plate.

Therefore, there is room for improvement in the art.

BRIEF DESCRIPTION OF THE DRAWING

Many aspects of the embodiments can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
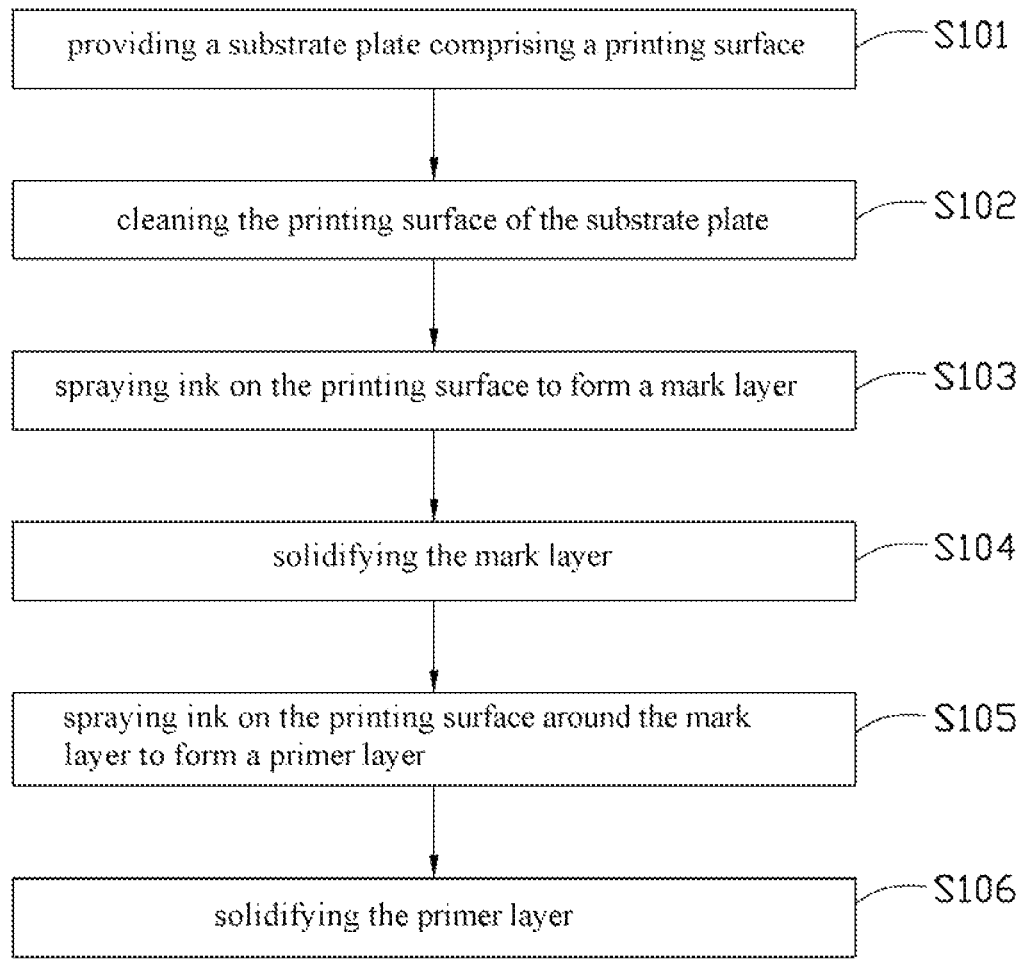
FIG. 1 is a flow chart of an embodiment of a key labeling method.
Figure 2:
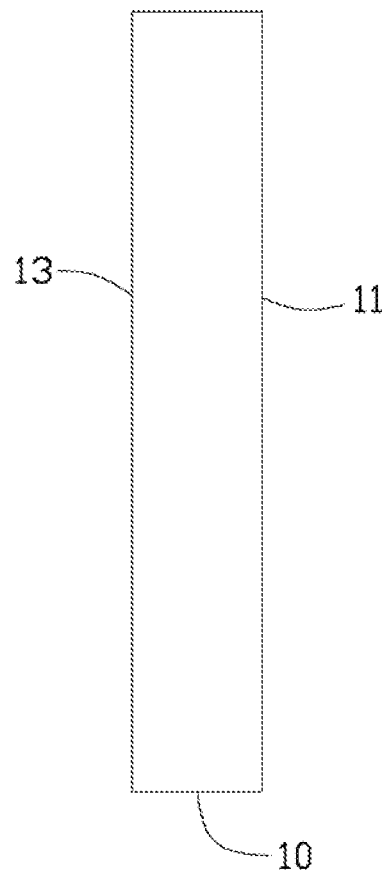
FIG. 2 is a schematic view of a substrate plate prepared for printing a label.
Figure 3:
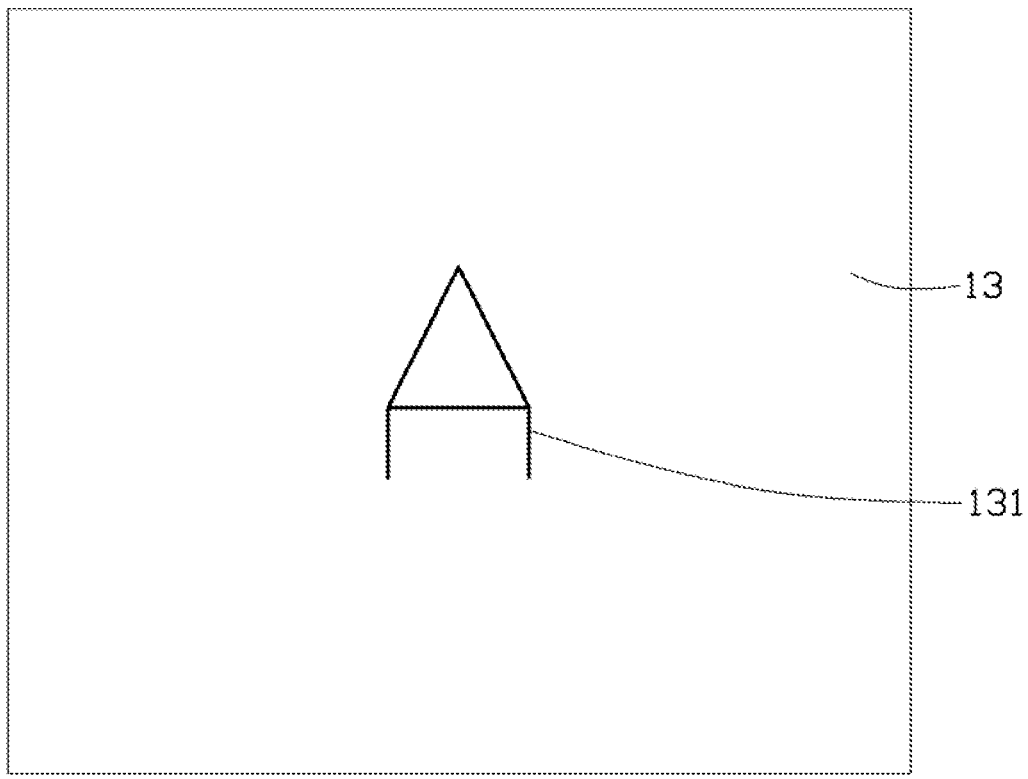
FIG. 3 is a schematic view of the substrate plate having a label layer formed thereon.
Figure 4:
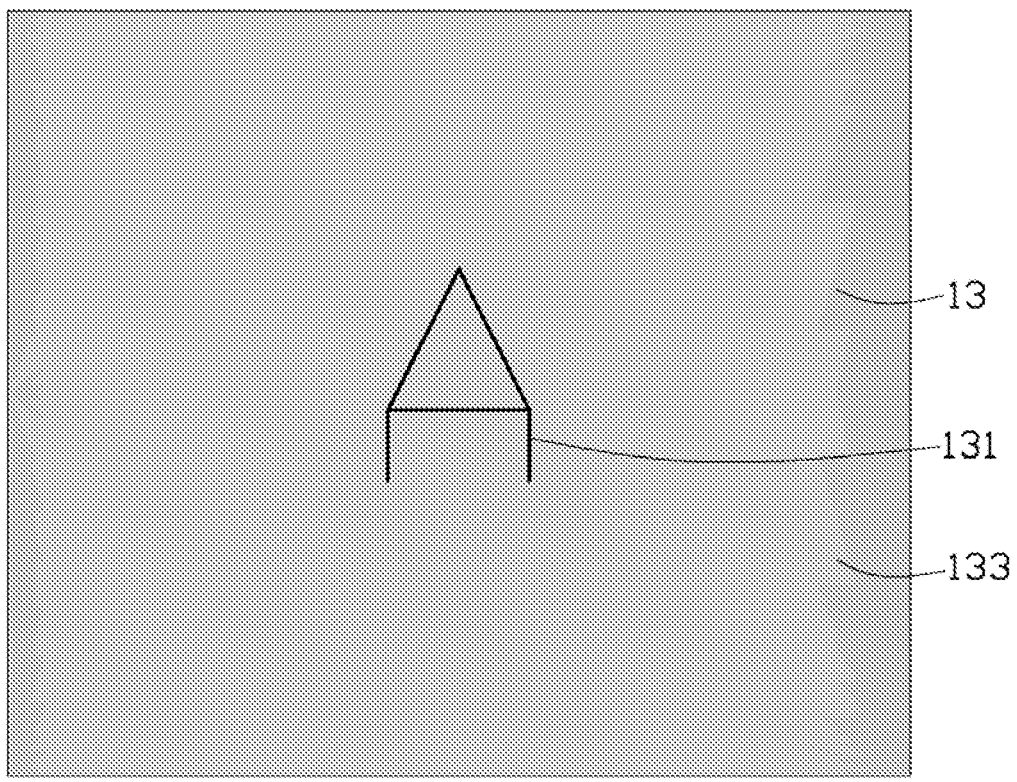
FIG. 4 is a schematic view of the substrate plate having a primer layer formed thereon.

Referring to FIGS. 1 through 4, an embodiment of a key labeling method includes the following steps.

In step S101, a substrate plate 10 is provided. The substrate plate 10 is made of transparent materials. In one embodiment, the substrate plate 10 is a keypad of a mobile phone having a pressing surface 11 and a printing surface 13 (shown in FIG. 3) opposite to the pressing surface 11.

In step S102, the printing surface 13 of the substrate plate 10 is cleaned to contaminants, that have been deposited on the printing surface 13. In one embodiment, the printing surface 13 of the substrate plate 10 is cleaned by using alcohol to wash or wipe the printing surface 13.

In step S103, a label layer 131 is formed on the printing surface 13 of the substrate plate 10. In one embodiment, a liquid UV ink (ultraviolet printing ink) is sprayed on the printing surface 13 of the substrate plate 10 by a solvent ink-jet printer (not shown) to form the label layer 131. In one embodiment, the UV ink is transparent ink. The solvent ink-jet printer includes an ink-jet head. The distance between an ink jet head of the solvent ink-jet printer and the label layer 131 varies from about 1.5 mm to about 2.5 mm, while the solvent ink-jet printer is working.

In step S104, the label layer 131 is solidified. In one embodiment, ultraviolet rays illuminate the label layer 131 to quickly solidify the label layer 131 of the printing surface 13. The radiant energy of the ultraviolet rays varies from 900 Joule (J) to 1100 J. A preferred radiant energy of the ultraviolet rays is 1000 J. An illumination time of the label layer 131 is preferred to be about 20 seconds (s) to about 40 s.

In step S105, a primer layer 133 is formed on the printing surface 13 of the substrate plate 10 around the label layer 131. In one embodiment, a liquid UV ink is sprayed on the printing surface 13 to form the primer layer 133. After solidification, the label layer 133 is in a solid state. The primer layer 133 is in a liquid state and forms a surface tension. The primer layer 133 tends to withdraw under the affect of the surface tension, this result in the segregating of the primer layer 133 from the label layer 131. Thus, the mingling between the primer layer 133 and the label layer 131 is difficult to occur thereby the label being clear to see. In one embodiment, the UV ink is transparent ink to enable the color of the primer layer 133 to be displayed by a backlight in the dark.

In step S106, the primer layer 133 is solidified. In one embodiment, ultraviolet rays illuminate the primer layer 133 to quickly solidify the primer layer 133 of the printing surface 13. The radiant energy of the ultraviolet rays varies from 900 Joule (J) to 1100 J. A preferred radiant energy of the ultraviolet rays is 1000 J. An illumination time of the label layer 131 is preferred to be about 20 seconds (s) to about 40 s.

The liquid UV ink of the label layer 131 and the primer layer 133 may also be sprayed by a solvent ink-jet printer, the liquid UV ink of the label layer 131 and the primer layer 133 each may be achieved at one time.

An electrostatic dust collecting process may be applied to the printing surface 13 of the substrate plate 10 after using alcohol to wash or wipe the printing surface in step S102 for further cleaning of the printing surface 13. In one embodiment, an electrostatic dust collector (not shown) is provided to clean the remaining contaminants from the printing surface 13 of the substrate plate 10.

The steps of S102 may also be omitted if the substrate plate 10 provided is clean enough.

It is to be understood that the label layer 131 and the primer layer 133 may also be solidified by the suns rays.

It is to be understood that the label layer 131 and the primer layer 133 may also be sprayed on the pressing surface 11, thus, a protection layer is needed here to cover the pressing surface 11 when in use.

It is to be understood that the key labeling method may further include a polishing or burnishing process applied to the pressing surface 11 and the printing surface 13 of the substrate plate 10 after step S101, in order to decrease a roughness concentration of the substrate plate 10.

It is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A key labeling method comprising:

providing a substrate plate;
spraying ink on the substrate plate to form a label layer;
solidifying the label layer;
spraying ink surrounding a periphery of the label layer without overlapping with the label layer to form a primer layer, thereby generating a surface tension in the primer layer to segregate the primer layer from the label layer; and
solidifying the primer layer.

2. The key labeling method of claim 1, wherein the ink for forming the label layer and the primer layer is UV ink.

3. The key labeling method of claim 1, wherein a liquid UV ink is sprayed to the substrate plate by a solvent ink-jet printer to form the label layer and the primer layer.

4. The key labeling method of claim 3, wherein the label layer and the primer layer are solidified by ultraviolet rays.

5. The key labeling method of claim 4, wherein the radiant energy of the ultraviolet rays varies from 900 Joule (J) to 1100J, an illumination time of the label layer is preferred to be 20 seconds (s) to 40s.

6. The key labeling method of claim 3, wherein the solvent ink-jet printer comprises an ink-jet head, the distance between the ink-jet head and the label layer varies from 1.5 mm to 2.5 mm while the solvent ink jet printer is working.

7. The key labeling method of claim 3, wherein the liquid UV ink is transparent ink.

8. The key labeling method of claim 1, wherein the substrate plate comprises a printing surface, the label layer and the primer layer are formed on the printing surface.

9. The key labeling method of claim 8, wherein the key labeling method further comprises a polishing or burnishing process applied to the printing surface of the substrate plate before spraying ink on the substrate plate to form a label layer, in order to decrease a roughness concentration of the substrate plate.

10. A key labeling method comprising:
providing a substrate plate comprising a printing surface;
cleaning the printing surface of the substrate plate;
spraying ink on the printing surface to form a label layer;
solidifying the label layer;
spraying ink surrounding a periphery of the label layer without overlapping with the label layer to form a primer layer, thereby generating a surface tension in the primer layer to segregate the primer layer from the label layer; and
solidifying the primer layer.

11. The key labeling method of claim 10, wherein the key labeling method further comprises a polishing or burnishing process applied to the printing surface before cleaning the printing surface of the substrate plate.

12. The key labeling method of claim 10, wherein cleaning the printing surface of the substrate plate comprises using alcohol to wash or wipe the printing surface.

13. The key labeling method of claim 12, wherein cleaning the printing surface of the substrate plate further comprises an electrostatic dust collecting process applied to the printing surface of the substatrate plate after using alcohol to wash or wipe the printing surface.

14. The key labeling method of claim 10, wherein the ink for forming the label layer and the primer layer is UV ink.

15. The key labeling method of claim 14, wherein the label layer and the primer layer are solidified by ultraviolet rays.

16. The key labeling method of claim 10, wherein a liquid UV ink is sprayed to printing surface of the substrate plate by a solvent ink jet printer to form the label layer or the primer layer.

17. The key labeling method of claim 16, wherein the solvent ink-jet printer comprises an ink-jet head, the distance between the ink-jet head and the label layer varies from 1.5 mm to 2.5 mm while the solvent ink-jet printer is working.

18. The key labeling method of claim 16, wherein the liquid UV ink is transparent ink.

19. A key labeling method comprising:
providing a substrate plate;
spraying liquid UV ink on the substrate plate to form a label layer;
solidifying the label layer by ultraviolet rays, radiant energy of the ultraviolet rays varies from 900J to 1100J, and an illumination time of the label layer is 20s to 40s;
spraying liquid UV ink around the label layer to form a primer layer; and
solidifying the primer layer by ultraviolet rays, radiant energy of the ultraviolet rays varies from 900J to 1100J, and an illumination time of the label layer is 20s to 40s.

* * * * *